Jan. 24, 1928.                                                                1,657,120
J. C. GROFF
VALVE GEAR FOR INTERNAL COMBUSTION ENGINES OF THE
COMPRESSION IGNITION TYPE
Filed April 20, 1925          3 Sheets-Sheet 3

INVENTOR
Joseph C. Groff
BY
Cooper, Kerr & Dunham
HIS ATTORNEYS

Patented Jan. 24, 1928.

1,657,120

UNITED STATES PATENT OFFICE.

JOSEPH C. GROFF, OF NEW YORK, N. Y.

VALVE GEAR FOR INTERNAL-COMBUSTION ENGINES OF THE COMPRESSION IGNITION TYPE.

Application filed April 20, 1925. Serial No. 24,407.

The present invention relates to valve gear and more particularly to valve gear for internal combustion engines such as Diesel engines and other like engines of the compression ignition type.

With these and other forms of engines it is desirable if not important that provision be made for varying and controlling the instant of valve opening, as related to the instant at which the power piston is at some particular point in its cycle of operations, the duration or total period of valve opening, and the amount of lift of the valve. It is also desirable that the various adjustments of these valve regulation factors be made independently of one another at the will of the operator or by suitable automatic devices from a central control position, and in such a manner that adjustments of any of these factors of control do not in any way or to any material extent affect the adjustments of the remaining factors.

This is best exemplified in the case of such engines of the aforementioned type employing direct or airless fuel injection, where it is desirable to vary the size of the fuel charge injected into the combustion chamber by means of the fuel valve rather than by regulation of the fuel supplying mechanism, and this involves independently controlling both the rate of injection and the period of injection by said fuel valve. It is important to be able to vary both the timing and rate of injection independently of each other in order to achieve the desirable feature of controlled combustion under various speed conditions and with different grades of fuel. It is also important to vary the period of fuel injection, as determined by the period of fuel valve opening, in order to realize the most efficient spray nozzle velocities for different loads on the engine.

Heretofore attempts have been made to secure such independent adjustments, but these previous arrangements have not only been complicated but also have not entirely secured the desired results. For example, adjustments in the change of period of valve opening have affected and modified the time of valve opening and such changes in timing could not be corrected by the operator.

One object of the present invention resides in the provision of a valve gear which is so arranged that various controlling adjustments may be substantially independent of one another and under control from a central position. In the event that adjustments of one control affect another to a slight extent it is possible with my valve gear to correct or compensate the control which has been so affected. Such supplementary adjustment does not in any way affect the control previously adjusted.

According to the present invention the valve lift may be adjusted entirely independently of other factors of regulation, and in turn is unaffected by their adjustments. Changes in the period of valve opening may be made without in any way affecting the instant of valve opening. Changes in the instant of valve opening may be effected with only a slight change in the period of opening, which change in period may be afterward compensated for by adjustment of the control determining the instant of valve closure, and hence the period of opening, which as previously explained in no way affects the instant of valve opening nor the lift of the valve. Furthermore, the aforementioned change in period of opening due to variation in timing may be eliminated by properly interlocking the operating controls of my valve gear.

A further object of the present invention resides in the provision of a valve gear which will be of utility in connection with automatic governing devices for governing within the fuel admission period of any cycle instantaneously existent with conditions tending to vary the engine speed. It will be understood that governing within a cycle is generally desirable, but it is even more so in the case, as typified by the large types of multicylinder internal combustion prime movers, whose resultant turning effort is sufficiently uniform to warrant elimination of a flywheel with considerable saving in expense, if provision is made to compensate for the sacrifice of rotatory inertia, necessary to absorb instantaneous load variations for even small time elements.

A further object of the present invention resides in the provision of a valve gear which may be used for reversing purposes, as for example in direct reversible marine engine installations, without the employment of supplemental cams, cam shifting devices or other auxiliary mechanism.

A further object of the present invention resides in the provision of a valve gear in which the effects of variable clearances, occurring in said gear and driving mechanism, may be readily compensated for by adjustments of the controlling devices at a central position to effect group adjustment. Provision is also made for effecting individual or separate adjustments of each of the valve units of a multicylinder engine, in order to equalize their performance for any one or series of group adjustments without affecting said group adjustments as a whole. Preferably this result is achieved by employing a valve gear mechanism in which the various coacting parts function by angular or circumferential movements and also one in which the necessary valve control adjustments (individual as well as group) involve like movements of some of said parts, whereby those inevitable small clearance discrepancies resulting from wear in service, change in temperature, imperfection of manufacture, unskillful assembly, or other similar causes produce extremely small, if any, effects upon the performance of those parts of the valve mechanism, success of whose functioning depends largely upon linear movements of small and necessarily constant magnitude. It will be understood that clearance discrepancies such as accompany ordinary commercial manufacturing practice may occur between such circumferentially acting parts without harm, since the mitigating effect resulting from such small irregularities occurring as extremely small arcs at relatively considerable distance from the respective centers of rotation or oscillation, as the case may be, results in their final effects being almost imperceptible. Furthermore, any such irregularities which might occur may be readily compensated for by simple counteracting adjustments of the controls as previously mentioned.

A further object of the present invention resides in the provision of means whereby a valve such as the fuel injection valve previously referred to may be opened in a comparatively gradual manner and be seated almost instantly. Gradual opening of an airless injection fuel valve is desirable in order to prevent the objectionable detonating effect resulting from almost instantaneous combustion due to sudden and rapid rate of fuel injection at a time when the rate of combustion chamber volume increase, as determined by motion of the power piston, is slow, by injecting the initial portion of the fuel charge at reduced rate, and hence with reduced spray nozzle velocity, and therefore in a relatively poorly atomized state conducive to more gradual combustion. It will be understood that it is important to effect instantaneous closure of an airless injection fuel valve in order to prevent the resultant tapering off of spray nozzle velocity were the valve to close gradually, to cause injection of the last portion of the fuel charge in such a poorly atomized state and with such limited power to effect penetration at a time when the pure air available for its combustion is more nearly a minimum, as to result in an increase in fuel consumption due to combustion of said fuel continuing up to and being incomplete at the instant of exhaust.

A further object of the present invention resides in the provision of means whereby the principles involved in my invention may be put into practice in a commercially feasible manner without involving a complicated mechanism, nor one, in which carefully maintained adjustments are necessary for sustained operation.

Other and more detailed objects and advantages of the present invention will be hereinafter pointed out in the accompanying specification and claims, and shown in the drawings which by way of illustration, show preferred embodiments of my invention.

My valve gear employs a valve lifting device capable of varying the valve lift from "no lift" to any desired maximum lift or fractional parts thereof, said lifting device being actuated preferably by camming gear affording means for controlling and adjusting the relation between the instants of valve opening and completion of the power piston's compression stroke and means for independently adjusting the instant of valve closure and hence the period of valve opening.

Figures 1, 2, 3, 4, 5:
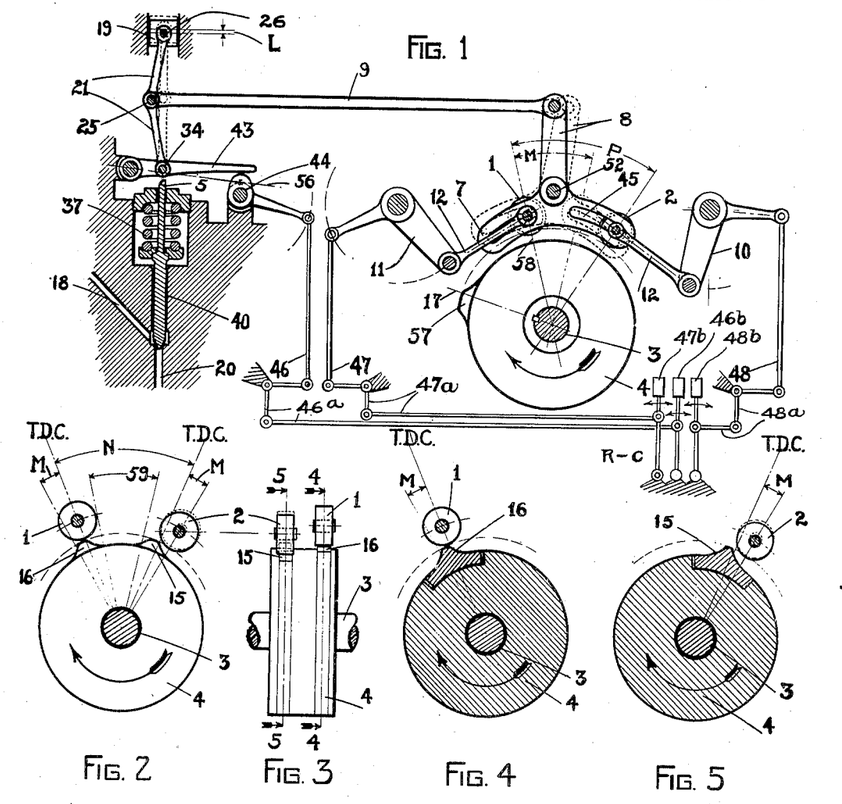
Fig. 1 illustrates diagrammatically the principle and arrangement of the linkage involved in my valve gear, which for purposes of illustration is shown operating in conjunction with any suitable airless fuel injecting device for a compression ignition internal combustion engine which is considered to be of the two-cycle type throughout the following specification, although not limited to such. One form of such a fuel injecting device is described in my copending patent application filed August 5, 1924 (Serial No. 730,330) in which reference is made to the valve gear herein described.
Fig. 2 shows a lateral end view of my novel camming device whereby the preferably inactive central region or arc (M in Fig. 1, 59 in Fig. 2), is spanned without sacrificing small desirable periods of valve opening, as in the case of the camming device illustrated in Fig. 1.
Fig. 3 shows an end view of the device illustrated in Fig. 2.
Figs. 4 and 5 are lateral section views of the camming device shown in Figs. 2 and 3 and are taken substantially on the lines 4—4 and 5—5 in Fig. 3 in the direction of the arrows.

Referring to Fig. 1 which illustrates diagrammatically the arrangement involved, 40 is the packed portion of the stem of a fuel valve interposed between and controlling passage of the fuel charge from the supply conduit 18 to the conduit 20 leading to the spray nozzles not shown in the drawings, said fuel valve being held on its seat by the downward thrust of the spring 37. The characteristics of the aforementioned fuel injecting device herein shown are such that the pressure of the fuel in the supply conduit 18 is substantially constant at its maximum value during the period of fuel admission regardless of the rate of injection or of the quantity of fuel injected into the combustion chamber.

The action of my valve lifting device results from the linear displacement of a movable joint or pivot located on and accompanying change in the relative angular position of an oscillating link or system of links, when movement of said movable joint is constrained along a straight line which preferably passes thru the center of the relatively fixed joint of the linkage about which oscillation of same takes place. Thus in Fig. 1 the two links 21 illustrate diagrammatically the general form of linkage involved, where 34 is the relatively fixed joint about which the lower link 21 oscillates through a small angle under control of and due to the intermittent reciprocating movements of the link 9, which is jointed with the links 21 at any convenient point such as 25.

Figure 6:
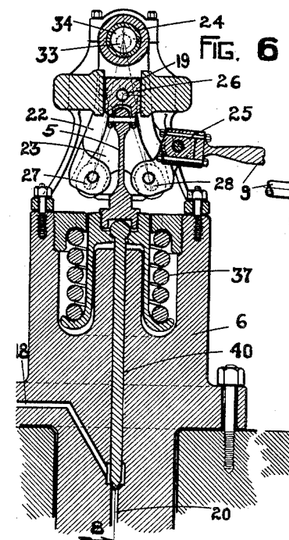
Fig. 6 shows a more detailed longitudinal section view of the fuel injecting device previously referred to and of a preferred embodiment of my valve lifting device, the section being taken on the line 6—6 of Fig. 8.
Figure 8:
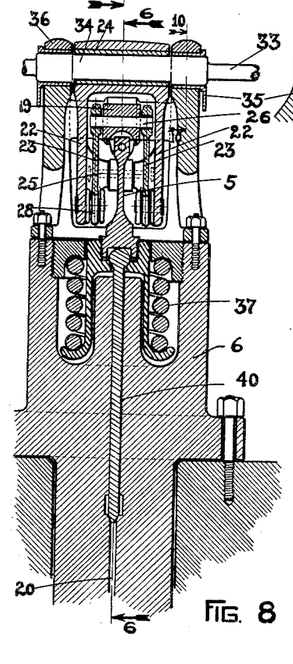
Fig. 8 shows a longitudinal section of the fuel injecting and valve lifting devices and illustrates more clearly the arrangement of the valve lifting linkage, and the means for varying the valve lift. The section is taken on the line 8—8 of Fig. 6 in the direction of the arrows.

The valve 40 has its upper end suitably connected to cross-head block 19. This connection is not shown in diagrammatic Fig. 1, but is fully shown and described in connection with the detailed description of the mechanism given hereinafter for parts 6 and 8 wherein similar reference characters are used. It is sufficient to here state that as crosshead block 19 is raised the valve 40 is lifted from its seat and vice versa.

The two "at rest" positions of the valve lifting linkage are substantially as shown, the one indicated by the dotted lines denoting the position of the links when the valve 40 is off its seat and held in that position by the locking action of the linkage which results when all of the joints 34, 25 and 26 lie substantially along the same straight line.

Figure 16:
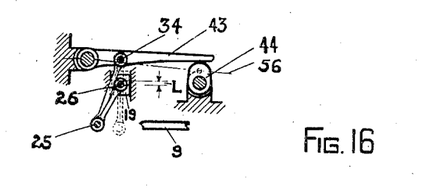
Fig. 16 illustrates diagrammatically the form of modified toggle joint linkage illustrated in Fig. 1 which I prefer to employ in my valve lifting device. Similar joints in said preferred linkage have the same numbers as those shown in Fig. 1.

It will be understood that almost any desired maximum valve lift may be secured in this manner by proper co-ordination of the amplitude of oscillation of the link 21 together with variation of the lengths of said links. Any desired fractional part of such maximum lift may be imparted to the valve by adjustment of the relative longitudinal position of the relatively fixed joint of oscillation 34 in any suitable manner, such as by means of the lever 43 and the cam 44. Such shifting of the point of oscillation 34 has the effect of changing the amount of valve lift by an amount equal to such movement of 34. Thus in Fig. 1 the valve lift is a maximum when the lever 43 is in the position shown, zero when in the position indicated by 56 and fractional for intermediate positions of 43. The reach rod 46 connects the variable lift device with a hand control or with suitable automatic governing devices not shown in the drawings. I prefer to employ the modified form of linkage shown diagrammatically in Fig. 16 for my valve lifting device, especially when the valve opens by an outward (from the combustion chamber) movement as in the case of the fuel valves herein shown. The operation of the modified form is substantially similar to that in Fig. 1, the similarly functioning parts bearing the same reference numbers.

The valve lifting linkage, again referring to Fig. 1 (also Fig. 16) is actuated and controlled through the link 9 by the arm 8 which is attached to the rocker 7 and with which it oscillates about the fixed point of suspension 52 due to the intermittent camming action of the cam piece 57 as same alternately engages the rollers 1 and 2 which are mounted and are capable of circumferential movement in the slotted grooves 45 on the rocker part 7. Revolving in the direction indicated by the arrow, the cam 57 first engages the roller 1 imparting to it a substantially radial movement, which action causes the rocker 7 and arm 8 to move from the position shown in full lines to that indicated by the dotted lines, in which latter position the valve 40 is raised from its seat by a lift L and remains open until the cam 57 has moved through an angle denoted by the arc P, when it engages the roller 2, to return the rocker parts 7 and 8 to their original central position, in which, the valve is closed.

The cam piece 57 and wheel 4 are relatively fixed with respect to the cam shaft 3 and in such a position that, when the leading edge of the cam profile, or substantially where the radial line 17 intersects its profile in Fig. 1, engages the roller 1 in the position shown, the power piston is at top dead center. Earlier opening of the fuel valve is effected by circumferential movement of the roller 1 about the cam shaft axis as a center and in a direction opposite to that of the cam rotation by any suitable means such as the rocker arm 11 and connecting link 12 under control from some central position through the rod 47. Similarly the period of valve opening may be increased or lessened by circumferential movement of the roller 2 in the or opposite to the direction of cam rotation respectively, under control of 48.

It will be understood that central or remote controls may be used. For the purposes of the present specification the members 46, 47 and 48 may be considered as the remote control members. They may extend to any distant point and there be provided with any suitable handles, or throttle control devices of any form well known in the art. Although not shown in Figs. 6, 7, 8, 9 and 11, corresponding independent reach rods and crank arms or other equivalent mechanism are employed to controllably rotate the tappet roller lay shafts 31 as well as the valve lifting linkage fulcrumed shaft 33. Such a remote control arrangement is diagrammatically shown in Fig. 1 and indicated R-C. The dependent link 46 through a linkage 46$^a$ connects to a handle control member 46$^b$; 47 through a linkage 47$^a$ connects to a hand control member 47$^b$; and 48 through a linkage 48$^a$ connects to a hand control member 48$^b$. The various hand control members 46$^b$, 47$^b$, and 48$^b$, which together constitute the remote control R-C, are capable of independent adjustment.

It will be understood that circumferential movement of the roller 2 by means of the rocker arm 10 and the link 12 to change the instant of valve closure and hence the period of valve opening, has no effect upon the adjustment of the roller 1 and hence no effect upon the timing of opening. However, change in timing by circumferential adjustment of roller 1 changes the period of valve opening by an amount equivalent to such adjustment although it may readily be compensated for by similar movement of the roller 2. If desirable this compensating movement of roller 2 may be automatically effected by interlocking the controls, which act through the reach rods 47 and 48 in any suitable manner not shown in the drawings, so that adjusting movement of roller 1 automatically imparts a movement of the same magnitude and in the same direction to roller 2, thus eliminating need for subsequent adjustment of the latter as previously mentioned.

Referring now to the camming device illustrated in Fig. 1 it will be understood that such an arrangement involving a single cam 57 interposes the objection that the period of valve opening is necessarily that pending rotation of cam 57 through the intervening arc between the rollers 1 and 2, and the minimum value of this arc must be relatively large in order to span that portion of the rocker 7 which is adjacent to the line of centers passing through the point of oscillation 52. since respective location of the rollers 1 and 2 within this central region would be too near said point of oscillation 52 to effect actuation of the rocker without involving objectionable stresses upon the parts, due to the small leverage afforded in said region. Furthermore, the amplitude of radial movement of the rollers by camming action in this central region would necessarily be relatively small and therefore sensitive to objectionable variation from the effects of small clearance discrepancies. Since it is advisable to eliminate this central region of the rocker 7, as indicated by the arc M in Fig. 1, it would be necessary to restrict the innermost positions of the rollers with respect to the center line, to that substantially as illustrated by the position of roller 1 and by the dotted position of roller 2 in Fig. 1. It will be understood that spanning the angle of arc M would result in a minimum period of valve opening, which, for a fuel injecting valve of the airless type, would be excessive and therefore objectionable if not out of the question.

It will also be understood that reversal of engine rotation, which in the case of an internal combustion engine of the compression ignition type is accompanied by change in the relation between the instants of fuel valve opening and completion of the power piston's compression stroke, would be impossible in Fig. 1 without angular re-adjustment of the camshaft 3 with respect to the crankshaft (not shown) when reversing. This is due to the fact that the acting positions of the rollers 1 and 2 for initial movements of the rocker 7 for ahead and astern rotation of 3 respectively do not coincide, since they must necessarily be located on opposite sides of the line of centers and separated by the previously mentioned intervening inactive region. Such angular re-adjustment of the camshaft 3 involves sufficient auxiliary mechanism to encourage provision of means to render such adjustment of the camshaft unnecessary, especially for those types of engines which would require such angular adjustment solely for the fuel injecting devices, as for example in the case of port scavenged two-cycle engines.

Figure 7:
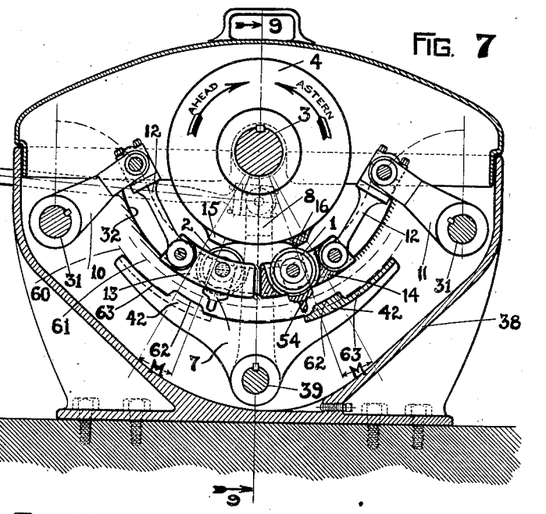
Fig. 7 shows a lateral section view illustrating diagrammatically a preferred embodiment of my valve regulating gear for operation in conjunction with a fuel injection valve or any analogous device where variable timing and periods of opening are desirable and where reversal of rotation is effected or compensated for by such variation in timing. The section is taken substantially on the line 7—7 of Fig. 9.
Figures 9, 10:
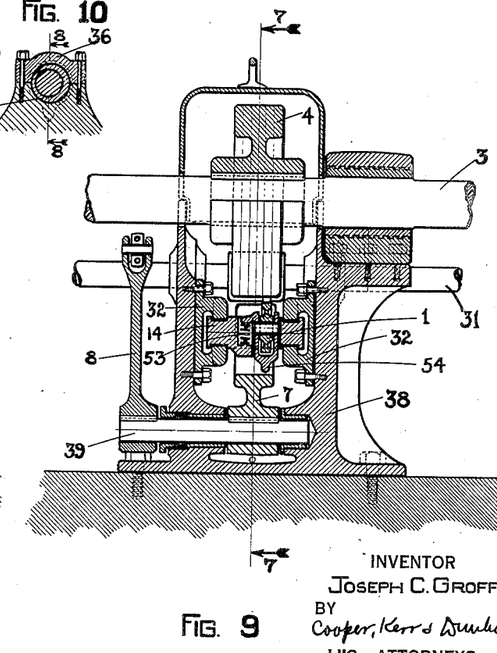
Fig. 9 shows a longitudinal section of the valve regulating gear shown in Fig. 7 and is taken substantially on the line 9—9 of Fig. 7 according to the arrows.
Fig. 10 shows a longitudinal section of a portion of the valve lifting device illustrated in Figs. 6 and 8 and illustrates more clearly a preferable method of making individual adjustments of the valve lift without interfering with universal or group adjustments of same. It is taken on the line 10—10 of Fig. 8 according to the arrows.
Figure 11:
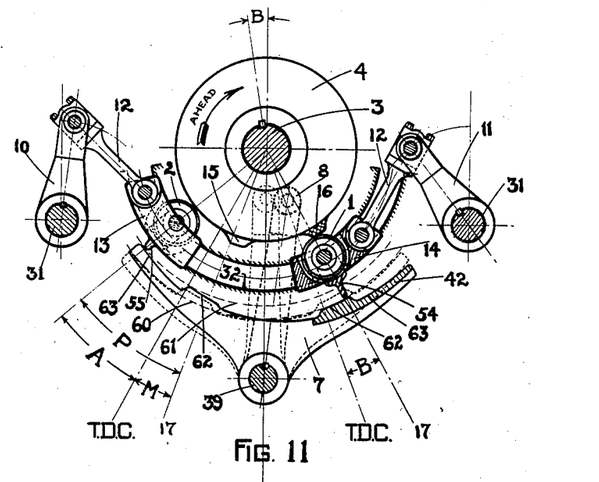
Fig. 11 shows a diagrammatic lateral section view of the valve regulating device illustrated in Figs. 7 and 9 and illustrates the relative arrangement of the parts when the engine, and cam shaft 3 driven thereby, is rotating in the ahead direction as indicated by the arrow.
Figure 12:
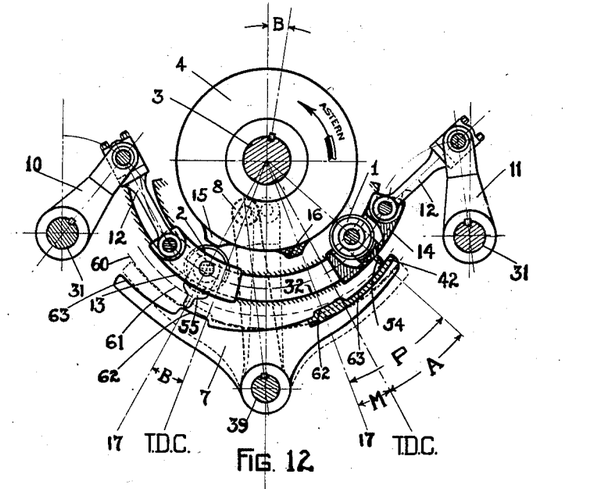
Fig. 12 shows a similar view of the device illustrated in Fig. 7 but for rotation of the engine and cam shaft in the reverse or astern direction.

In connection with employment of my valve gear for fuel injecting valves, I prefer to use the novel camming device illustrated diagrammatically in Figs. 2, 3, 4 and 5 and also in more detail in Figs. 7, 9, 11 and 12 which show what I now consider the preferred embodiment of my invention for this type of valve. The arrangement shown in Figs. 7, 11 and 12 is substantially the same as that illustrated diagrammatically in Fig. 2, except that the position of same is inverted in order to immerse those co-acting parts of the mechanism subject to wear in a bath of lubricant for quietness of operation and automatic lubrication. All similarly acting parts have the same respective numbers in the various figures. As shown in Fig. 9, the rocker 7 transmits its oscillating motion to the arm 8 by means of the shaft 39 which is mounted in the body portion 38 substantially as shown, provision being made to pack its joint therewith.

In this embodiment of my invention I prefer to avoid the construction by which the rollers 1 and 2 are carried and guided by slotted grooves in the oscillating rocker member 7 as shown in Fig. 1, by employing the construction shown in Figs. 7 and 9 where the rollers are mounted on forked tappets 55 and 54, or, other suitable devices, said tappets being free to reciprocate in radial directions in any suitable guiding portions of the respective interposer elements 14 and 13, which in turn are guided for circumferential movement in the semi-circular grooved members 32 which are secured and fixed with respect to the housing 39. Preferably the tappet-roller elements 1—55 and 2—54 are returned inwards toward the camwheel 4 to the position indicated by arc 61, by any suitable means such as by the spring 53 shown in Fig. 9, in order that circumferential adjusting movements of said tappets may be effected without their fouling portions of the irregular profile of rocker 7.

Referring to Fig. 2, 3 is the camshaft and 4 a camwheel carried and rotated thereby through drive gear connecting it with the crankshaft not shown in the drawings. The cam pieces 15 and 16 bear fixed adjustment with respect to the camshaft at all times and each revolves in a separate lateral plane engaging but one of the rollers namely 2 and 1 respectively, as shown more clearly in Figs. 3, 4 and 5. The effective portions or substantially the leading edges of said cam pieces facing in the direction of rotation are separated by sufficient angular interval so as to span the inactive arc 59 (same as M in Fig. 1) which was taken to be the absolute minimum (for the smallest possible period of opening with arrangement in Fig. 1) with any desirable margin over this minimum, or such as indicated by the arc N in Fig. 2, which shows the cam rollers 1 and 2 in their respective innermost circumferential positions for a minimum period of valve opening. It will be understood that the camming actions of 15 and 16 overlap each other by an angular amount substantially equivalent to the angle included between radial lines which intersect the profile of said cam pieces at the respectively effective points of initial camming movement for ahead and astern rotation. This angular amount of overlap and hence minimum period of valve opening, which is designated in the various valve diagrams by the arc M, is however sufficiently small to be satisfactory without objection. Also in Figs. 11 and 12 the arc B indicates any desirable maximum period of opening prior to completion of the power piston's compression stroke, the angular position of which is denoted by T. D. C. on the various valve diagrams, where also the arc A denotes any desirable maximum period of valve opening after T. D. C. and arc P denotes the resulting total period of valve opening. It will be understood that the arcs M and B are substantially equal.

Referring to Figs. 2, 7, 11 and 12 it will be understood that, with my novel camming device involving separate cams in different lateral planes, the necessary change in the relation between the instants of fuel valve opening and completion of the power piston's compression stroke, may be effected merely by interchanging the functions of cam rollers 1 and 2 which are always engaged by the same cam piece, namely 16 and 15 respectively, regardless of the direction of rotation of the camshaft, which automatically follows that of the crankshaft. Such interchange is effected by varying the relative circumferential positions occupied by the respective rollers, and this is made possible by the fact that, in my valve gear, maintenance of the valve in its open position is not dependent upon continued contact between the cam rollers and cam pieces, as with present types of camming and valve gear devices. The cam pieces 15 and 16 have for their function the delivery of actuating impulses, timed for instant of action rather than for duration of action, in radial directions to the respective roller-tappets 1—55 and 2—54, it being understood that the valve is held in its open position by the locking action of the valve lifting linkage as previously mentioned.

Thus for ahead rotation, referring to Fig. 11 which illustrates the arrangement of the parts in one of the optional adjustment settings for this direction of rotation, cam roller 1 engaged solely by the cam piece 16, imparts valve opening movements to the valve lifting linkage through 7, 8 and 9, while roller 2 engaged solely by the cam piece 15, imparts valve closing movements to said linkage. It will be understood that these two intermittent camming actions which comprise the process of valve performance, are repeated on each revolution of the camshaft. Referring now to Fig. 12, which shows a similar arrangement of the parts but for astern rotation, roller 2 engaged solely by cam piece 15 imparts valve opening movements to rocker 7, while cam roller 1 engaged solely by cam piece 16 imparts valve closing movements to said rocker. In Figs. 11 and 12 the respective circumferential positions of the rollers 1 and 2 are shown as being such, that the valve is given its earliest possible opening B prior to T. D. C., which maximum value B, though preferably fixed in designing the valve gear for any particular type of engine, may have any desirable value to meet the operating requirements of said engine.

It will be understood, and more clearly so by referring to Figs. 7, 11 and 12, that, when interchanging the opening and closing functions of the respective cam rollers 1 and 2, provision must be made to cope with the condition, that camming action of roller-tappet 1—55 must always produce a clockwise oscillating movement of 7 and 8, while that of 2—54 must always produce a counter clockwise oscillating movement of same, regardless of their circumferential positions within the prescribed limits. I provide novel means of meeting this condition, and preferably by shaping the profiles of the toe pieces 42, secured to the rocker 7 in any suitable manner, substantially as shown, where tappet action on the rocker 7 to effect valve opening movements is confined to the inner raised (towards center of cam shaft) portions 62, and where tappet action to effect valve closing movements is confined to the outer relatively depressed (away from camshaft center) portions 63 of said toe pieces. With this novel construction, involving two distinct regional spheres of tappet action, (i. e. at different radial distances from center of camshaft) one for valve opening, and one for valve closing movements by each of the respective roller tappets 1—55 and 2—54, it will be understood that the sphere of oscillation of rocker 7 and the attached arm 8, and therefore the sphere of reciprocation of the link 9 driven thereby, are automatically transferred into their proper location when interchanging the functions of the roller-tappets for reversal, to produce a valve opening movement of 7, 8 and 9, regardless of which roller-tappet imparts the initial movement to said rocker. Figs. 11 and 12 show the state of affairs substantially at the instant of valve opening, and the radial lines 17 indicate the approximate point of camming effectiveness of the leading portions (i. e. facing in direction of instantaneous rotation) of the cam profiles of 15 and 16 for each particular direction of rotation.

Again referring to Figs. 11 and 12 it will be understood that reversal of engine rotation which is accompanied by interchange of the roller-tappet functions as previously mentioned, is also accompanied by a rotational relocation or shift of the T. D. C. positions of the camming gear in the new direction of rotation, and by an angular amount substantially equivalent to the maximum desired valve opening prior to top dead center shown as arc B. Such shift of the T. D. C. positions for tappet action on the rocker 7, which is involved with employment of the previously mentioned raised portions 62 of same, for reversing purposes, and which is therefore governed in amount by that of the maximum desired period of prior valve opening, introduces no objectionable feature other than the necessity of automatically shifting the T. D. C. positions of the camming device accordingly. This is preferably accomplished by separating the leading and following, or, ahead and astern effective camming portions of the profiles of each of the cam pieces 15 and 16 by a substantially angularly equivalent interval to that of the angle of shift. Fig. 7 indicates this angular equivalency, of each of the cam pieces 15 and 16 and of the raised portions 62 of 7, more clearly, and it will be understood that the previously mentioned overlap of camming actions of 15 and 16 is largely caused by this construction of giving said cams separably acting T. D. C.'s for different directions of rotation. It will also be understood that the period of such overlap, and hence the resulting equivalent minimum period of fuel valve opening, being governed solely by the maximum desired period of prior valve opening (i. e. by arc of raised valve opening tappet acting portion 62) which for the larger relatively slow speed engines, for which this valve gear is primarily intended, seldom exceeds 8 crank degrees, is unobjectionable for proper functioning of a fuel injecting valve.

Of importance is the provision to be made when the rollers 1 and 2 are in any neutral circumferential position or setting, and referring to Fig. 7, which shows the arrangement of parts when said rollers are in one of these neutral settings, it will be understood that, any circumferential setting, in which, neither of said rollers engages any portion of either of the raised pieces 62, is a neutral position, since such engagement is necessary to cause a valve opening movement of 7. And it will be seen by studying the profile of rocker 7, when same is in open and closed positions as shown in Figs. 11 and 12, with respect to the arcs 61 and 60 which respectively represent the spheres of start and completion of outward tappet movements, that I provide novel means of insuring that, although no oscillating movement of 7 occurs in any neutral setting of the rollers, the rocker must always automatically return to the valve closed position regardless of the instant at which such neutral setting is effected.

It is desirable if not necessary to provide automatic means whereby the amplitude of oscillation of the rocker 7 and attached arm 8 will be substantially constant regardless of the circumferential positions of the rollers 1 and 2 and their respective tappets 54 and 55 as shown in Figs. 7, 11 and 12. It will be understood that, as the angular relation between the line of centers through the point of oscillation 52, and the line of radial tappet movement increases as the roller position is moved circumferentially out and away from said line of centers, the magnitude of said tappet movement must increase to compensate for the resultant action of, recession of tappet action from the point of oscillation (with increase in leverage and hence arc of travel), and of decrease in the effective component of said tappet action which is useful for oscillating effect of 7 about 52 or 39.

I provide novel means for automatically maintaining constant amplitude of oscillation of the arm 8, as illustrated in Figs. 7, 11 and 12 where as shown, the throw or eccentricity of the cam pieces 15 and 16 is substantially the same as the maximum required radial movement of the tappets 55 and 54, which, it will be understood, occurs when the respective rollers 1 and 2 occupy the most remote circumferential position from the line of centers. As the positions of the rollers 1 and 2 move inward to said line of centers in the course of various adjustments, the radial tappet movements are automatically reduced as regards their effectiveness to produce oscillating movement of rocker 7, although the actual amplitude of said radial tappet movements is at all times substantially constant or fixed, by means of the eccentrically disposed profiles of the portions 62 and 63 of the toe pieces 42 secured to rocker 7. The eccentrically disposed profiles of these toe plates vary the effective throw of the tappets from "no throw" to the maximum throw by automatically creating definite and correct clearances between said tappets and that portion of the rocker profile upon which they act, in accordance with conditions for any definite circumferential position of the rollers. This can be better understood by reference to Figs. 7, 11 and 12 noting the relation existing between the portions 62 and 63 of the toe pieces 42 and the regions of start and completion of outward tappet movement, respectively, denoted by the arcs 61 and 60, for the different positions of rocker 7 and of the roller-tappets 1—55 and 2—54.

As previously explained, reversal of engine rotation which is accompanied by interchange of functions of the roller-tappets, is also accompanied by change in the direction of initial opening movements imparted to the valve lifting linkage through the connecting link 9. Provision of the reversibly actuated valve lifting and locking device, the preferred embodiment of which is illustrated diagrammatically in Figs. 13, 14 and 15 and also in more detail in Figs. 6 and 8, is to be considered an important feature of the present invention. Its general method of functioning may be better understood by noting the positions of the linkage for the valve open position for each direction of rotation, as related to that for the valve closed position.

Figure 13:
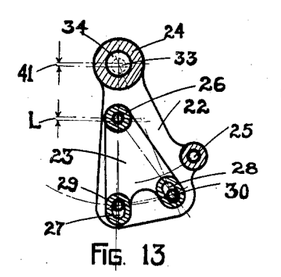
Fig. 13 illustrates diagrammatically the relative angular positions of the links comprising the preferred embodiment of my valve lifting device, as illustrated in more detail in Figs. 6 and 8, together with the preferable locking means for holding the valve 40 off its seat in the open position for ahead rotation of the engine.
Figure 14:
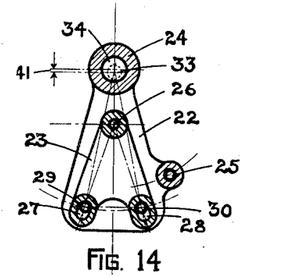
Fig. 14 shows another view of the device shown in Fig. 13 and illustrates the position occupied by the links 22 and 23 whenever the valve 40 is closed regardless of direction of rotation.

Thus, referring to Fig. 13, which illustrates the valve open position of the linkage for ahead rotation, it will be understood that oscillation of said linkage from the valve closed position, shown in Fig. 14, raises the valve by any desired maximum lift L due to the same relative displacement of the joint 26 by contact of the pin 29 carried by link 22, with the upper part of the slotted portion 27 of link 23. Also, the valve is locked in this open position during the period of valve opening, or, between camming actions of the valve gear, due to the tendency of the spring 37, acting downward on the joint 26 of link 23 through 5 (see Figs. 6 and 8 for details), to rotate the linkage in a counterclockwise direction about 34, being prevented by engagement of the pin 30 carried by link 22, with the lower part of the slotted portion 28 of link 23. To insure positiveness of locking action, it is preferable that the contact joint between pin 29 and link 23 be slightly offset from the line of centers in the direction of valve opening oscillatory movement of the linkage, as shown in Fig. 13, which offset has practically no effect upon the amount of desired valve lift, due to the almost negligible effect upon such lift from small discrepancies in 29's angular position in the immediate region of the center line.

Figure 15:
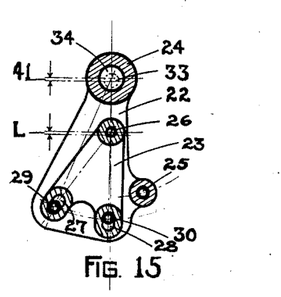
Fig. 15 shows another view of the device shown in Fig. 13 and illustrates the relative angular positions of the links 22 and 23 when the valve 40 is in the open position for rotation of the engine in the astern direction.

Fig. 15 illustrates in a similar manner the valve open position of the linkage for astern rotation, where pin 30 acting upon link 23 raises and holds the valve unseated with any desired maximum lift L due to the locking action of pin 29 with the lower part of the slotted portion 27 of link 23. In Figs. 13, 14 and 15 the driving link 9 shown in Figs. 6 and 7 is attached at any suitable point such as 25. Also, the corresponding positions of the driving arm 8 and other valve gear parts are shown in Figs. 11 and 12, where also the dotted positions of rocker 7 and arm 8 indicate their valve closed positions accompanying that of the linkage as shown in Fig. 14.

In the preferred embodiment of my valve lifting device, again referring to Figs. 6, 8, 13, 14 and 15, I prefer to vary the valve lift from the maximum to "no lift" by mounting the link 22's relatively fixed joint 24, about which oscillation of the linkage takes place, on the eccentrically disposed section 34 of the shaft 33, which is capable of oscillatory adjusting movement in the sleeve bearings 35 (see Fig. 10). It will be understood that, although the valve opening movement of joint 26 is L for the angular position of 33 and 34 as shown in the Figs. 13 and 15, said amplitude of movement is reduced according to the amount that the joint 24 is moved vertically downwards, and the maximum amount of such downward movement, shown as 41, is substantially equal to the maximum valve lift L. Separate adjustments of the individual valve lifting devices for a multicylinder engine may be effected by angular adjustments of the eccentric bearing sleeves 35 shown in Figs. 8 and 10, same being fitted with dials and suitable reference markings.

With my novel camming and valve lifting devices whereby maintenance of the valve in its open position is not dependent upon continued contact between the cams and cam rollers, it will be understood that the leading effective camming portions of the profiles of each of the respective cam pieces 15 and 16 may be given any desirable shape to effect any desirable gradual rate of valve opening, for rotation in either direction, without in any way affecting the desirable instantaneous closure of same, since the rate of valve closing is not dependent upon shape of cam profile, it being effected by the action of spring 37 (Figs. 6 and 8) once the closing movement, imparted to the valve lifting linkage by link 9, exceeds the very small amount necessary to unlock said linkage, or substantially that of the previously mentioned small offset preferably employed for positive locking.

In connection with governing, it will be understood that regulation of the amount of fuel injected may be secured either by varying the rate of injection preferably by varying the fuel pressure at the spray nozzles, or by varying the period of injection preferably by varying the period of valve opening by proper circumferential adjustment of the respective roller-tappets controlling valve closure. I prefer to vary the rate of injection and this is achieved, in conjunction with a fuel supply at substantially constant pressure, through variable throttling effects accompanying passage of the fuel through the fuel valve, by varying the amount of fuel valve lift. Thus, with the rollers 1 and 2 in any suitable circumferential position to determine a desirable period of fuel valve opening in conjunction with any suitable fuel pressure at the spray nozzles, as controlled by the throttling effect for some particular amount of valve lift, governing within a cycle is effected by an oscillatory adjusting movement of the shaft 33 (connecting with all the cylinders of a multicylinder engine) to vary the valve lift and hence the rate of injection in accordance with the load variation. The adjustment of 33 would be subject to hand control when starting or maneuvering a marine engine in addition to being acted upon by automatic overspeed devices once it is set in any given running position.

I do not limit embodiment of my invention solely to the construction herein illustrated, as it is understood that analogous means, which, though not entirely desirable, may be employed to achieve the novel principles of operation involved in my valve gear. For example, I am aware that the cam roller-tappet members may be guided circumferentially and be free to reciprocate in radial directions, in a different manner from that herein shown, such as by mounting same in radial parts capable of being respectively and independently oscillated about the cam shaft; also, the relative positions of the cam rollers and cam pieces might be interchanged, so that the rollers would be mounted on the camwheel to bodily rotate with same to engage the tappets which would then have profiles substantially equivalent to those of the cam pieces herein shown; and, the reversibly actuated variable lift valve lifting linkage is subject to considerable modification, such as by substitution of rollers, eccentric bearing or cam pieces and the like for either of the two links herein shown, without departing from the broad scope of my invention.

What I claim is:

1. A valve gear comprising in combination with a valve member, means for tightly seating same, and driven means for operating said valve gear, means for operatively adjusting and controlling the time of valve opening, means for operatively adjusting and controlling the time of valve closure, said means by their conjoint action determining the period of valve opening, and said means for varying the instants of valve opening and of valve closure being capable of independent and conjoint selective adjustment from a remote central control position substantially as set forth.

2. A valve gear comprising in combination with a valve member, means for tightly seating same, and driven means for operating said valve gear, means for operatively adjusting and controlling the time of valve opening, means for operatively adjusting and controlling the time of valve closure, said means for adjusting the time of valve opening being capable of adjustment without affecting the time of valve closure and both said means for adjusting the time of valve opening and the means for adjusting the time of valve closure being capable of conjoint operation at the same time.

3. A valve gear comprising in combination with a valve member, means for tightly seating same, and driven means for operating said valve gear, means for operatively adjusting and controlling the time of valve opening, means for operatively adjusting and controlling the time of valve closure, said means for adjusting the time of valve closure being capable of adjustment without affecting the time of valve opening and both said means for adjusting the time of valve opening and the means for adjusting the time of valve closure being capable of conjoint operation at the same time.

4. A valve gear comprising in combination with a valve member, means for tightly seating same, and driven means for operating said valve gear, means for operatively and independently adjusting and controlling both the timing and period of valve opening, means for operatively adjusting and controlling the extent of valve movement, and means for effecting control adjustments of any of these respective factors selectively and independently of each other from a remote control position substantially as set forth.

5. A valve gear comprising in combination with a valve member, means for tightly seating same, and driven means for operating said valve gear, a camming device driven thereby, an oscillating linkage for operating the valve, a rocker member for operating and controlling said linkage, interposer elements intermediate said rocker and the camming device, a roller-tappet element mounted and guided for radial tappet movements by each of said interposers, said interposer elements being capable of circumferential adjusting movements about said cam device and with respect to each other to thereby permit independent adjustments of the time of valve opening and the time of valve closure, whereby optionally timed variable periods of valve opening may be secured.

6. A valve gear comprising in combination with a valve member, means for tightly seating same, and driven means for operating said valve gear, a camming device driven thereby, an oscillating linkage for operating the valve, a rocker member for operating and controlling said linkage, interposer elements intermediate said rocker and camming device, a roller-tappet element mounted and guided for radial tappet movements by each of said interposers, said interposer elements being symmetrically disposed for tappet action with reference to neutral axis of the camming device, and both of said roller-tappets act to operate the valve control rocker member for every revolution of said cam device, said interposer elements by interchange of their operating functions from those when operating in one series of circumferential positions to those for operation in another series of circumferential positions, also serving to suitably operate said valve control member in a reverse way when the direction of rotation of the camming device is reversed, substantially as set forth.

7. A valve gear comprising a driven camming device, roller-tappet elements mounted by interposing members intermediate said cam device and an oscillating valve control member, said camming device intermittently engaging the respective cam rollers to effect radial tappet movements thereby causing intermittent oscillatory or angular movements of said valve control rocker member, said interposer members being capable of independent circumferential adjusting movements about said cam device, the aforementioned valve control member having that portion of its surface subject to tappet action, of irregular profile, portions of which are substantially circular arcs eccentrically disposed to the center of cam rotation in certain respective positions of said rocker member to thereby introduce variable clearances between the tappets and the rocker member for different circumferential positions of said tappets, whereby the extent of oscillatory movement of said valve control rocker member may at all times be constant irrespective of the circumferential positions of either of said interposer elements.

8. A valve gear comprising a driven operating cam device, interposing members mounting roller-tappet elements and guiding same in radial and circumferential directions with respect to the cam shaft, a valve controlling rocker member intermittently operated by radial movements of said roller-tappets, and means for circumferentially and independently adjusting said interposer members about the camming device and with respect to each other while maintaining a fixed throw or extent of oscillatory movement of said valve control rocker member, substantially as set forth.

9. A valve gear comprising in combination with a valve member, means for tightly seating same, an oscillating linkage for opening the valve by one and the initial movement of the linkage and regardless of the direction of said movement, said linkage also locking the valve in this open position until the valve is closed by a second and restoring movement of the linkage, a rocker valve control member operating and controlling said linkage, a driven camming device for effecting intermittent oscillatory or angular movements of said control member in conjunction with radially acting roller-tappet elements, said roller-tappets also being capable of respectively independent circumferential adjustment about the cam device, said camming device comprising two cams each respectively rotating in separate lateral planes of said camming device, the leading effective portions of the profiles of said cams for either direction of rotation being separated by any desirable fixed angular interval, and each of said cams engaging a radially acting roller-tappet element respectively located in one of each of said lateral planes, said tappets being circumferentially separated by an adjustable angular interval which is always greater than the aforementioned fixed angular interval between said cams, and alternate camming actions between said cams and said roller-tappets always occur between the same respective cam and roller irrespective of the circumferential position of said tappets, or of the direction of rotation of the cams, thereby eliminating the excessive overlap of camming actions experienced with present camming devices whereby desirable optionally timed varying periods of valve opening of almost any desired length may be secured substantially as set forth.

10. A valve gear comprising in combination with a valve member, means for tightly seating same, an oscillating linkage for opening the valve by one and the initial movement of the linkage and regardless of the direction of said movement, said linkage also locking the valve in this open position until the valve is closed by a second and restoring movement of the linkage, a rocker valve control member operating and controlling said linkage, a driven camming device for effecting intermittent oscillatory or angular movements of said rocker member in conjunction with radially acting roller-tappet elements, said roller-tappets also being capable of respectively independent circumferential adjustment about the cam device, the aforementioned rocker control member having an irregular lateral profile comprising distinct individual sections substantially in the form of circular arcs of respectively different diameter and alternately concentric with and eccentrically disposed with respect to the camming device according to the position of the rocker member, said profile being substantially symmetrical with respect to the line of centers through the center of rocker oscillation and that of cam rotation, each half of said profile affording two distinct circumferential regions, one for valve opening tappet actions and one for valve closing tappet actions upon said rocker control member, that for valve opening tappet actions being circumferentially innermost with respect to said line of centers and also radially nearer the cams than that for valve closing tappet actions, to thereby automatically shift the sphere of oscillatory movements of said rocker member when interchanging the operating functions of said tappets for reversed cam rotation whereby a valve opening movement is always imparted to said rocker member and valve lifting linkage irrespective of which roller-tappet initially engages said valve control rocker member, substantially as set forth.

11. A valve gear comprising in combination with a valve member, means for tightly seating same, an oscillating linkage for operating said valve, an operating member for actuating and controlling said linkage, driven means for operating said control member, said linkage having provision for opening and locking the valve in the open position upon one and the initial movement of the operating member in either direction, and means for varying the timing of such initial movement of said operating member and of the linkage, substantially as set forth.

12. A valve gear comprising in combination with a valve member, means for tightly seating same, an oscillating linkage for operating the valve, an operating member for actuating and controlling said linkage, driven means for operating and controlling said operating member, said linkage having provision for locking the valve in the open position upon one and the initial movement of the operating member in either direction and means for unlocking the valve and reclosing same upon the second and restoring movement of the operating member whereby the rate of valve opening may be desirably gradual without sacrifice of almost instantaneous closure as with present camming means, substantially in the manner set forth.

13. A valve gear comprising in combination with a valve member, means for tightly seating same, an oscillating linkage for operating the valve, an operating member for actuating and controlling said linkage, driven means for operating and controlling said operating member, said linkage having provision for effecting an opening movement of said valve irrespective of the direction of initial movement imparted to it by said operating member, said linkage also having locking provision for maintaining the valve in the open position independently of said operating member and of said driven means, whereby desirable but previously unattainable features of valve functioning may be secured, substantially as set forth.

14. A valve gear comprising in combination with a valve member, means for tightly seating same, an oscillating linkage for operating said valve, driven means for actuating and controlling said linkage, said linkage having provision for opening the valve and maintaining same in the open position by and upon an initial movement in either direction, said linkage also having provision for adjusting and controlling the extent of opening movement which it imparts to the valve.

15. A valve gear comprising in combination with a valve member, means for tightly seating same, an oscillating linkage for operating the valve, driven means for actuating and controlling said linkage, said linkage being capable of effecting a valve opening movement of the valve by and upon and regardless of the direction of its initial movement, said linkage being further capable of maintaining the valve in this open position independently of said driven actuating means until a second and restoring movement is imparted to it, said oscillating linkage also having the relatively fixed center or joint about which it oscillates mounted on adjustable eccentric means whereby varying degrees of valve movement may be secured and controlled from a remote control position, substantially as set forth.

In testimony whereof I hereto affix my signature.

JOSEPH C. GROFF.